(12) United States Patent
Sharma et al.

(10) Patent No.: US 7,082,461 B2
(45) Date of Patent: Jul. 25, 2006

(54) METHOD TO CONFIGURE A BLUETOOTH LOGICAL LINK CONTROL AND ADAPTATION PROTOCOL CHANNEL

(75) Inventors: Om Sharma, Kirkland, WA (US); Doron J. Holan, Seattle, WA (US); Louis J. Giliberto, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 708 days.

(21) Appl. No.: 10/186,234

(22) Filed: Jun. 28, 2002

(65) Prior Publication Data

US 2004/0003062 A1  Jan. 1, 2004

(51) Int. Cl.
G06F 15/177 (2006.01)

(52) U.S. Cl. .................. 709/220; 709/227; 709/228; 709/229; 709/230

(58) Field of Classification Search ................ 709/220, 709/227–230
See application file for complete search history.

(56) References Cited

U.S. PATENT DOCUMENTS

| | | | | |
|---|---|---|---|---|
| 6,614,350 B1 * | 9/2003 | Lunsford et al. | ........ | 340/572.1 |
| 2001/0033554 A1 * | 10/2001 | Ayyagari et al. | ............ | 370/328 |
| 2002/0131388 A1 * | 9/2002 | Ami et al. | ................... | 370/338 |
| 2003/0108017 A1 * | 6/2003 | Famolari | .................... | 370/338 |
| 2003/0177219 A1 * | 9/2003 | Taib et al. | .................. | 709/223 |

FOREIGN PATENT DOCUMENTS

WO   WO 02/15527 A2   2/2002

OTHER PUBLICATIONS

"Host Controller Interface Functional Specification", Bluetooth Specification, Version 1.0B, Nov. 29, 1999, pp. 540-542, 571-572.
"Host Controller Interface Functional Specification", Bluetooth Specification, Version 1.1, May 8, 2001, pp. 590-591, 640, 728-729, 735.
"Assigned Numbers—Bluetooth Baseband", The Bluetooth SIG, Inc. Member Web Site @ http://www.bluetooth.org/assigned-numbers/baseband.htm, 5 pages.
"Logical Link Control and Adaptation Protocol Specification", Bluetooth Specification, Version 1.1, May 8, 2001, pp. 255-330.
"Service Discovery Application Profile," Bluetooth Specification, Version 1.0 B, Dec. 1, 1999, pp. 62-93.

* cited by examiner

Primary Examiner—Zarni Maung
Assistant Examiner—Glenford J Madamba
(74) Attorney, Agent, or Firm—Amin & Turocy, LLP

(57) ABSTRACT

A technique to simplify L2CAP channel creation/configuration for a node is presented. The method enables a node to determine how involved it is in the L2CAP channel connection creation and management process. There are three levels of participation that the node may specify. The three levels are no involvement at all, minimal involvement, and total involvement. In no involvement, the channel is dropped if a remote node does not accept all node specified parameters. In minimal involvement, the channel is dropped if a remote node does not accept all node specified parameters and the node is notified when the connection has been disconnected by a remote disconnect or HCI link loss. In the total involvement level, the node is fully involved in the channel creation/configuration. The node provides a function pointer that is called to confirm or reject parameters. If a parameter is unacceptable, the connection is disconnected.

32 Claims, 6 Drawing Sheets

METHOD TO CONFIGURE A BLUETOOTH LOGICAL LINK CONTROL AND ADAPTATION PROTOCOL CHANNEL

FIELD OF THE INVENTION

This invention relates generally to communication between Bluetooth devices and, more particularly, relates to configuring a logical link control and adaptation protocol channel.

BACKGROUND OF THE INVENTION

There are a significant number of wireless technologies in the marketplace today. One standard for short range wireless technology is called Bluetooth. Bluetooth is a Radio Frequency (RF) specification for short-range, point-to-multipoint voice and data transfer. Bluetooth can transmit through solid, non-metal objects. Its nominal link range is from 10 cm to 10 m, but the range can be extended to 100 m by increasing the transmit power. It is based on a low-cost, short-range radio link, and facilitates ad hoc connections for stationary and mobile communication environments.

The Bluetooth wireless technology allows users to make connections between communication devices such as mobile phones and desktop and notebook computers. Finding and communicating with services in these environments is becoming increasingly important due to the continued growth in wireless technologies as seen by the proliferation of mobile computing devices and also due to the merging of wireless technologies and computer technologies. These services can include basic services such as printing, faxing, paging, etc., more complex services such as video conferencing and teleconferencing, and any other type of service that a service provider may provide.

The Bluetooth SIG (Special Interest Group) specifies protocols that ensure interoperability between various devices. One of these protocols is the Logical Link Control and Adaptation Protocol (L2CAP). L2CAP enables multiple protocols and applications to coexist over a single Bluetooth RF connection. L2CAP provides connection-oriented and connectionless-data services to higher level protocols with protocol multiplexing capability, packet segmentation and reassembly operation, and the conveying of quality of service information.

Configuring a L2CAP channel involves an iterative negotiation process between two peer L2CAP entities that is quite cumbersome and prone to error. The negotiation process starts when one of the peers sends a configuration request to the other peer. The configuration request contains the requesting peer's desired settings for connection parameters. The receiving peer responds to the configuration request with a configuration response. The response informs the requesting peer which settings have been accepted and which settings have been rejected. If a setting has been rejected, the setting the receiving peer will accept is included in the response. The requesting peer determines what settings the receiving peer has accepted and has rejected. The requesting peer sends another configuration request with its choice of parameters for the settings that haven't been accepted. This configuration process continues until either all settings have been negotiated or one of the peers drops the channel.

Once a channel has been established, either peer may reconfigure the channel. This requires the peers to stop sending data (i.e., stop reading and writing) and renegotiate the channel settings using the same process used in configuring the channel. The configuration and reconfiguration processes require the peer to maintain state of the channel, handle errors, and handle the iterative negotiations. As a result, the complexity of each node (e.g., application, object, module, etc.) using a L2CAP channel increases due to the increase in code and the reliability of the node decreases.

BRIEF SUMMARY OF THE INVENTION

The present invention simplifies the L2CAP channel configuration process by enabling a node to determine how involved it is in the L2CAP channel connection creation and management process with a remote device. There are three levels of participation that the node may specify. The three levels are no involvement at all, minimal involvement, and total involvement. The L2cap channel is implemented in accordance with the level of participation selected.

At each level, the node can set specific parameters that result in a connection or not depending on the corresponding node's expectations. In the no involvement level, the node can specify an acceptable minimum and maximum transmission unit, a minimum and maximum flush timeout, Q.O.S (Quality Of Service), and the link timeout. If the remote node refuses the L2CAP connection for any other configuration parameter or specifies Q.O.S in the configuration request, the L2CAP connection is terminated. The L2CAP channel is also terminated if the remote node attempts to reconfigure the L2CAP channel.

In the minimal involvement level, the node specifies the same parameters as in the no involvement level. The L2CAP channel is terminated for the same reasons as in the no involvement level. The node provides a function pointer that is called on disconnect by either a remote graceful disconnect or abrupt loss of the HCI link. The L2CAP channel is terminated if a configuration request is received from the remote node after the L2CAP channel has been opened.

In the total involvement level, the node specifies the same parameters as in the no involvement level and any additional parameters the node needs. The node provides a function pointer that is called during the configuration stage to confirm or reject configuration parameters at various stages. A reconfigure request from the remote node is accepted and the node is involved via the function pointer in the reconfiguration process. The node's function pointer is called when either a configure response or remote configure request contains a QOS parameter and/or custom parameters. If at any time the configure parameters are unacceptable, the node returns a failure code and the connection is terminated.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
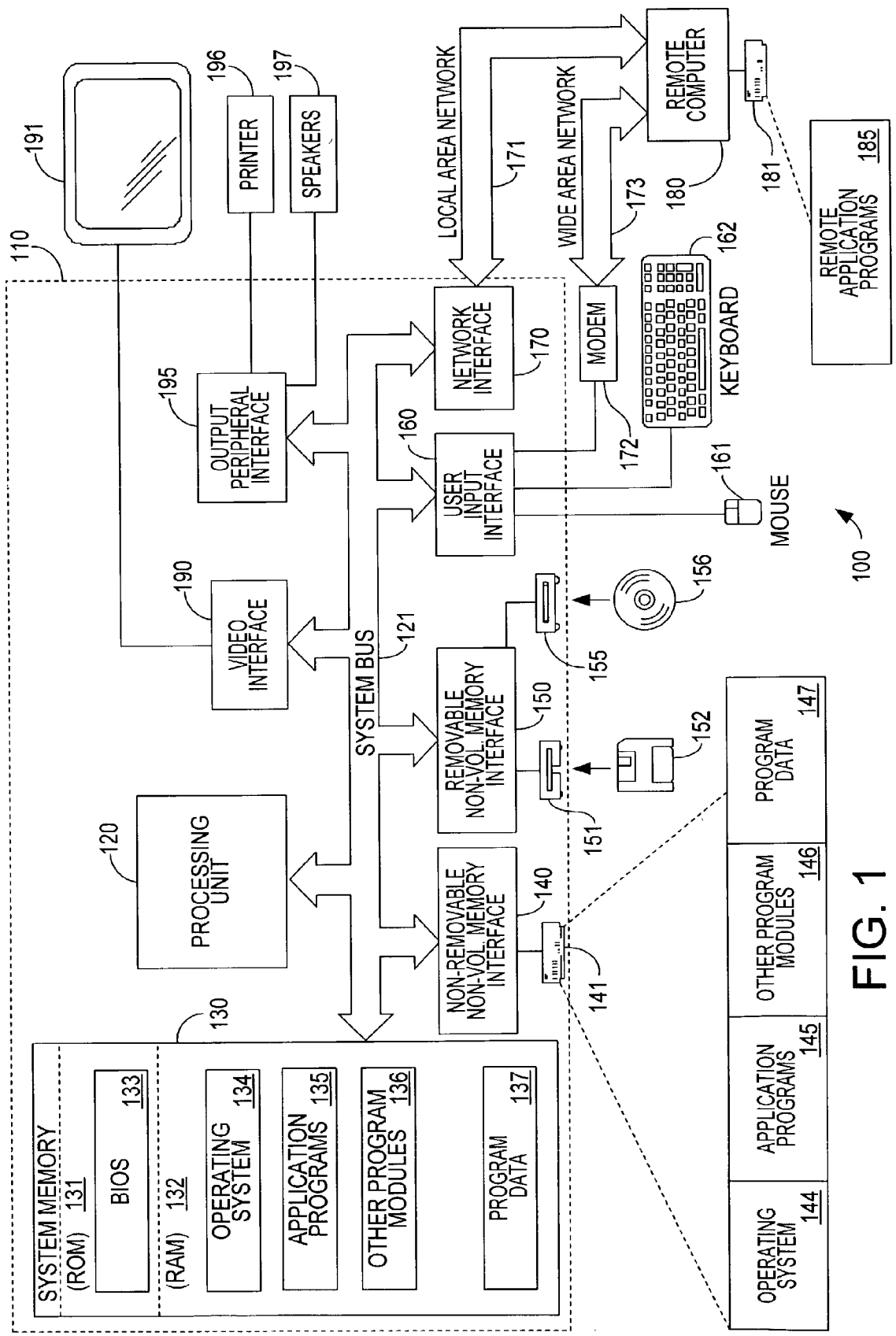
FIG. 1 is a block diagram generally illustrating an exemplary computer system on which the present invention resides.

As previously indicated, connecting and configuring a logical link control and adaptation protocol (L2CAP) channel involves an iterative negotiation process between two L2CAP entities that is quite cumbersome and prone to error. The present invention simplifies the L2CAP connection and configuration process by enabling a driver/device to ask for and get only the connection that is desired so complex negotiations are minimized or eliminated. This simplifies the code necessary for developers to incorporate Bluetooth capabilities in the driver/device and reduces the likelihood of error occurring.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, wireless devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, wireless devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
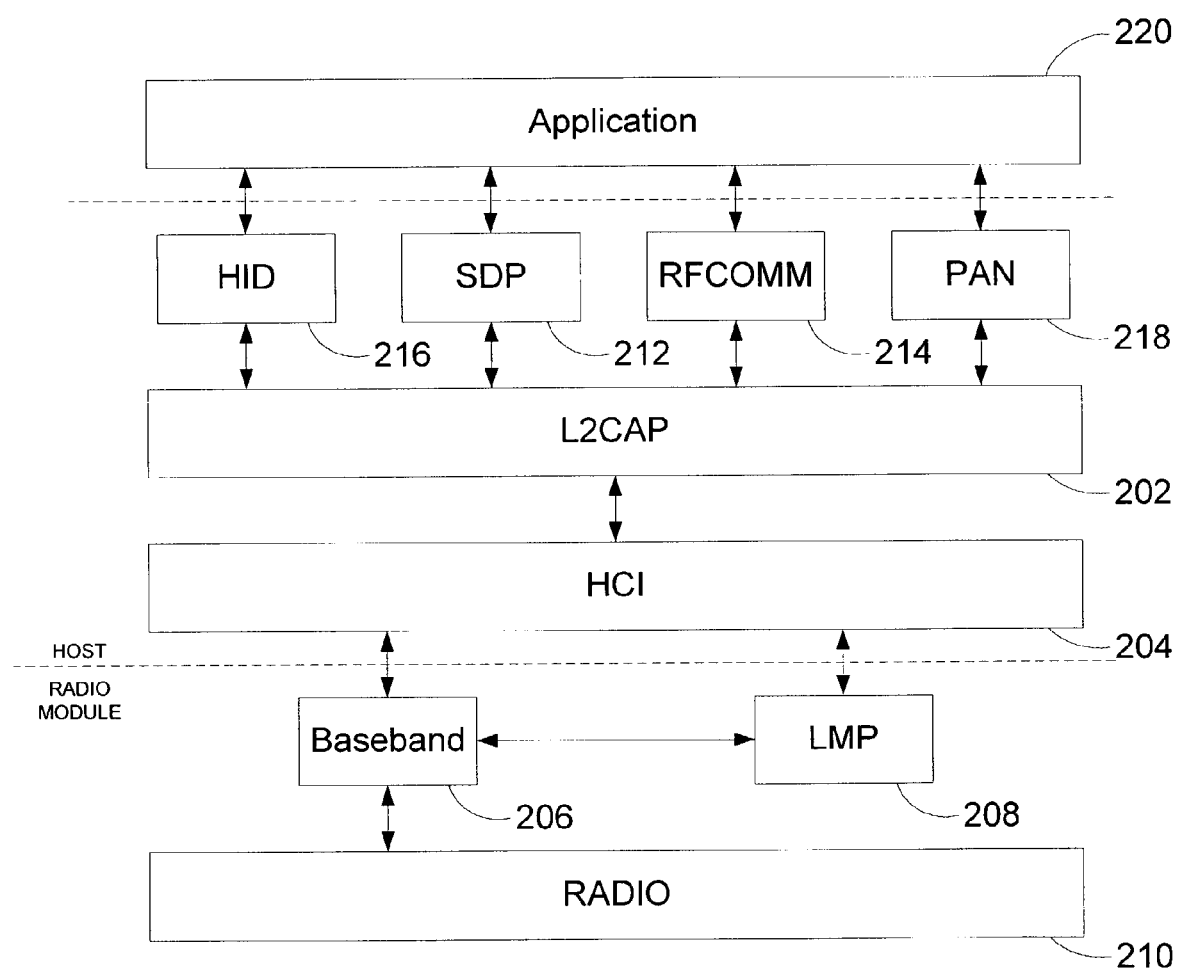
FIG. 2 is a block diagram of a Bluetooth protocol stack in which the present invention operates.

FIG. 2 illustrates the interrelationship of some of the components that make up a Bluetooth protocol stack and the components of the present invention. The protocol stack includes L2CAP layer 202, host controller interface (HCI) layer 204, baseband 206, link manager 208, radio layer 210, SDP layer 212, and RFCOMM layer 214. The protocol stack also includes other nodes that can run on L2CAP. For example, the nodes may include human interface device 216, personal area network 218, printer objects, and the like. Application 220 communicates with other applications via the Bluetooth protocol stack.

L2CAP 202 provides connection-oriented and connectionless data services to higher level protocols with protocol multiplexing capability, packet segmentation and reassembly operation, and the conveying of quality of service information. HCI layer 204 is a common interface that is used between a radio module and a host. Note that the HCI layer 204 is not mandated by the Bluetooth specification and is used only when the radio module (i.e., radio 210, baseband 206, and LMP 208) and host (i.e., L2CAP 202, SDP 212, and RFCOMM 214) are implemented separately.

Baseband 206 passes data and control messages between the HCI layer 204 and radio layer 210. Link manager 208 controls baseband 206. Radio layer 210 transmits and receives bits according to the pattern and frequency instructions received from the baseband layer. SDP 212 is a service advertisement and discovery protocol. RFCOMM 214 provides point-to-point RS-232 serial emulation in support of legacy applications.

Figure 3:
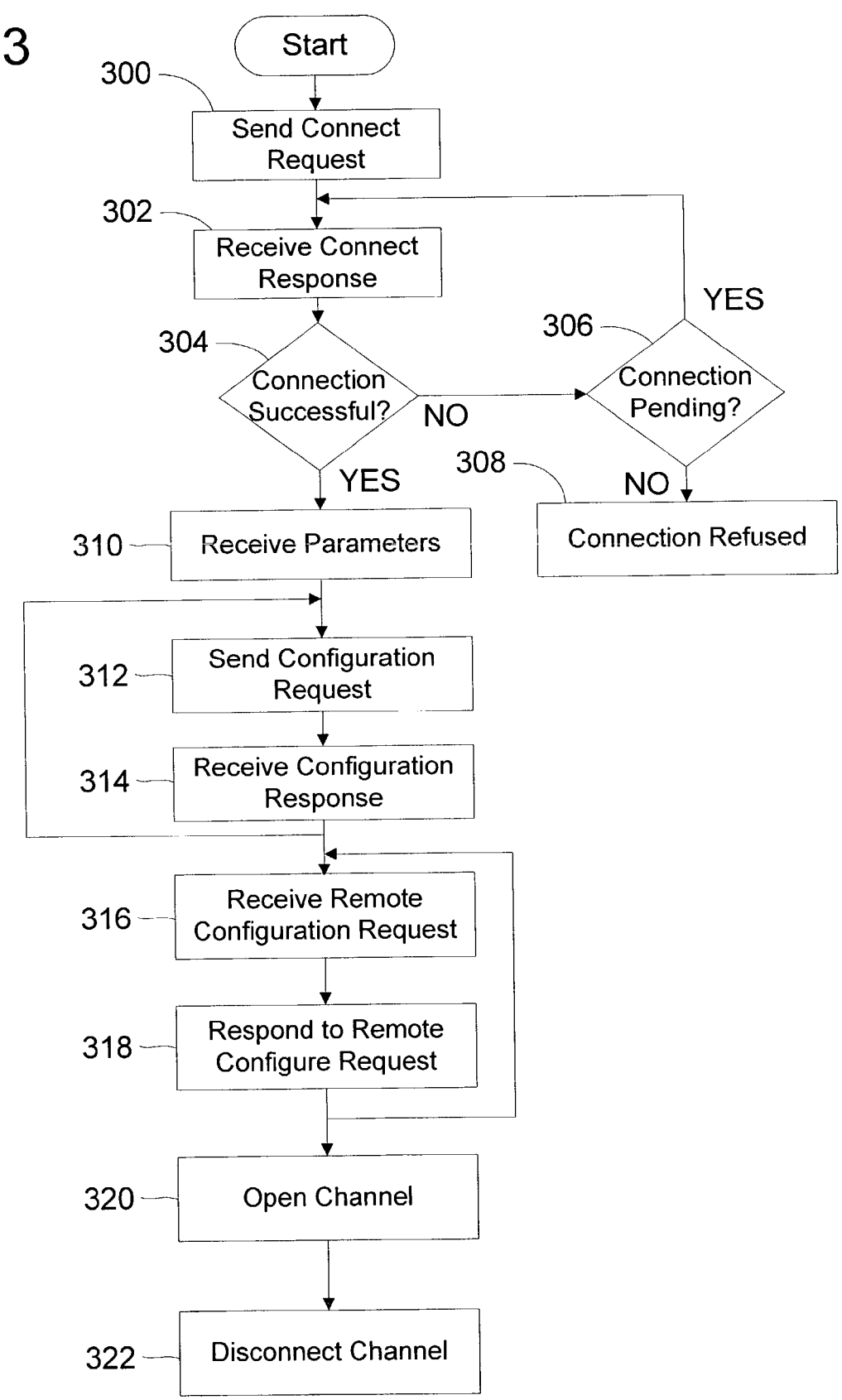
FIG. 3 is a flow chart illustrating the connection and creation process of a L2CAP channel.

Turning now to FIG. 3, the steps for connecting and configuring a L2CAP channel is illustrated. To establish a connection for a node, a connect request is sent (step 300). A node as used herein means any protocol, object, module, etc. that runs on L2CAP 202 and initiates the connect request.. A connect response is received (step 302). The connect response provides information to determine if the connection is successful (step 304), is pending (step 306), or is refused (step 308). If the connection is pending, the client waits until the connection is successful. To establish the connection on a remote node (e.g., the node that is the acceptor of the connection request), the remote node waits for a connect request and sends back a connect response to inform the node if the connection is successful, pending, or refused.

If the connection is successful, a range of acceptable parameter values are received from the node (step 310). Note that the parameter values may be received before the connection request is sent. The parameter values may include an acceptable minimum and maximum transmission unit, a minimum and maximum flush timeout, QOS (Quality Of Service), and the link timeout. The parameters are specified for inbound data and outbound data. The transmission unit specifies the payload size the node is capable of sending or receiving. The flush timeout informs the remote node the amount of time the node will attempt to successfully transmit a L2CAP packet before flushing the packet. The node may also specify a preferred value in the range of acceptable parameter values in addition to minimum and maximum parameter values. For example, the node can specify a minimum transmission unit value of 100, a preferred transmission unit value of 672, and a maximum transmission unit value of 1000. The L2CAP layer attempts to negotiate the preferred value whenever possible.

Negotiating a L2CAP channel begins with the L2CAP layer 202 sending the remote L2CAP layer a configuration request (step 312). The configuration request informs the remote node the non-default parameters for the request path that the node will accept. The parameters include the node's incoming transmission unit, outgoing flush timeout, and outgoing QOS the node will accept. The L2CAP layer 202 receives a configuration response from the remote L2CAP layer (step 314). The configuration response informs the node which parameter values the remote node has accepted or not accepted. In a typical negotiation process, steps 312 and 314 are repeated until the L2CAP layers have agreed to all values. A remote configuration request is received from the remote L2CAP layer (step 316). The remote configuration request informs the node the non-default parameters for response path the remote node will accept. The parameters include the remote node's incoming transmission unit, outgoing flush timeout, and outgoing QOS the remote node will accept. The L2CAP layer sends the remote L2CAP layer a remote configuration response (step 318). The remote configuration response informs the remote node which parameter values the node has accepted or not accepted. Typically, steps 316 and 318 are repeated until the L2CAP layers have agreed to all values. Note that the remote configuration request may be received before the configuration request has been sent.

Once the L2CAP channel has been configured, the L2CAP channel is open (step 320). Data is read and written. The L2CAP channel is disconnected (step 322) when a loss of the HCI link occurs, when the remote node disconnects the L2CAP channel, or when the node disconnects the L2CAP channel.

The present invention allows the node to determine how involved it is in the configuration and management of the L2CAP channel. The node informs the L2CAP layer 202 the level of involvement the node desires. There are three levels of participation that the node may specify. The three levels are no involvement at all, minimal involvement, and total involvement.

Figure 4A:
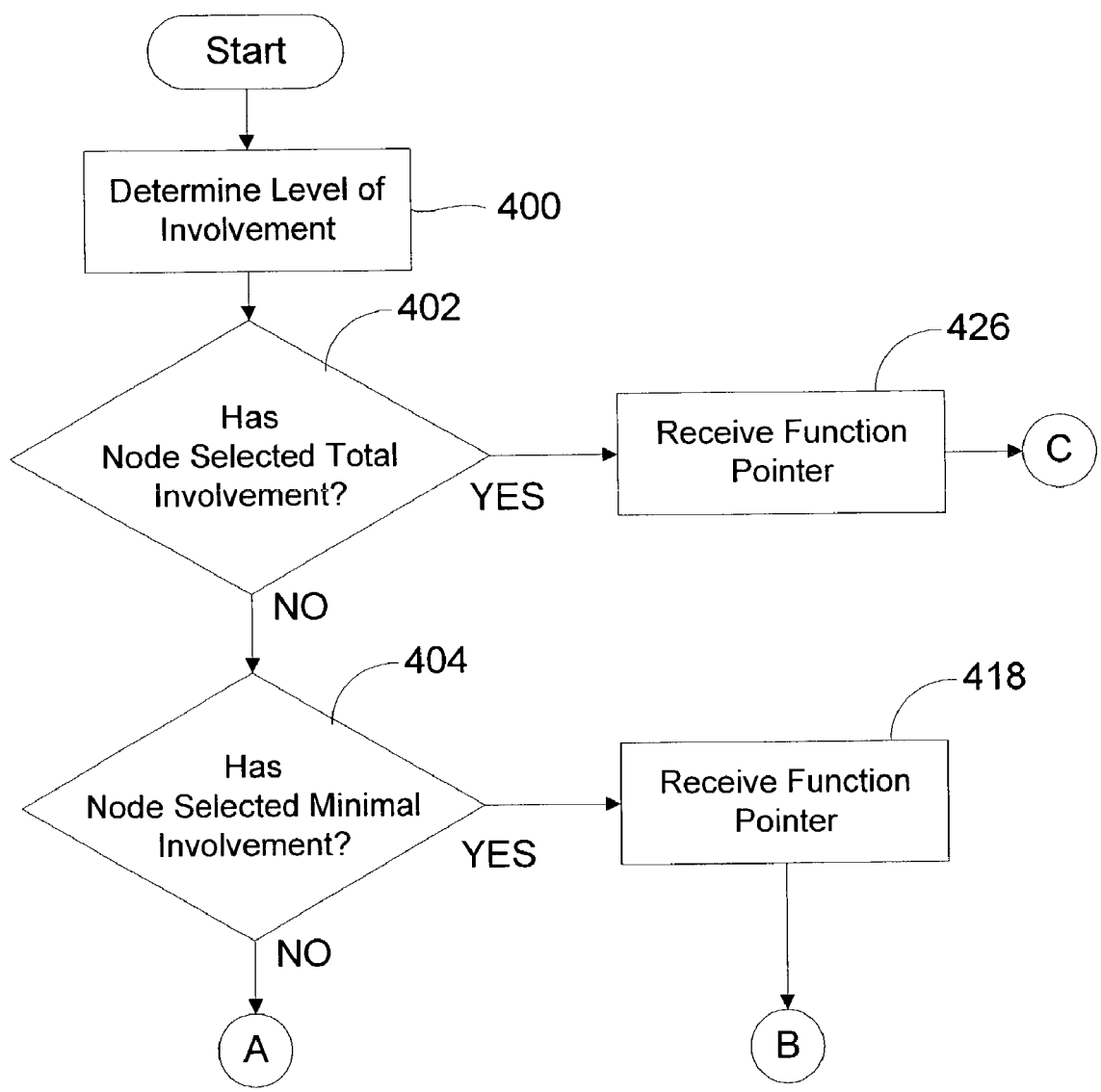
FIG. 4a is a first portion of a flow chart illustrating a method of a process for enabling a driver to participate in the creation and management of a L2CAP channel at a selected level of participation.
Figure 4B:
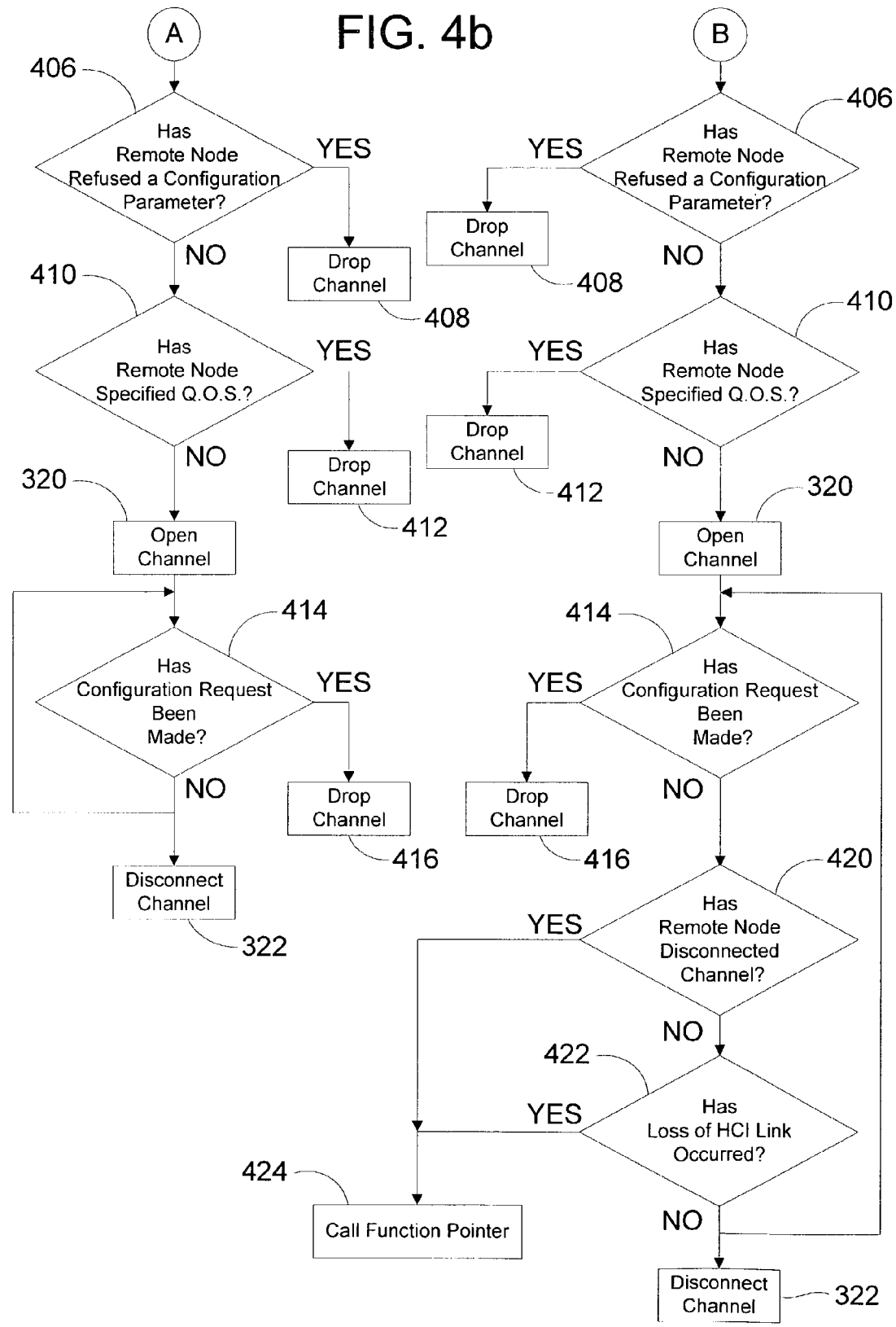
FIG. 4b is a second portion of a flow chart illustrating the process for enabling a driver to participate in the creation and management of a L2CAP channel at a selected level of participation.
Figure 4C:
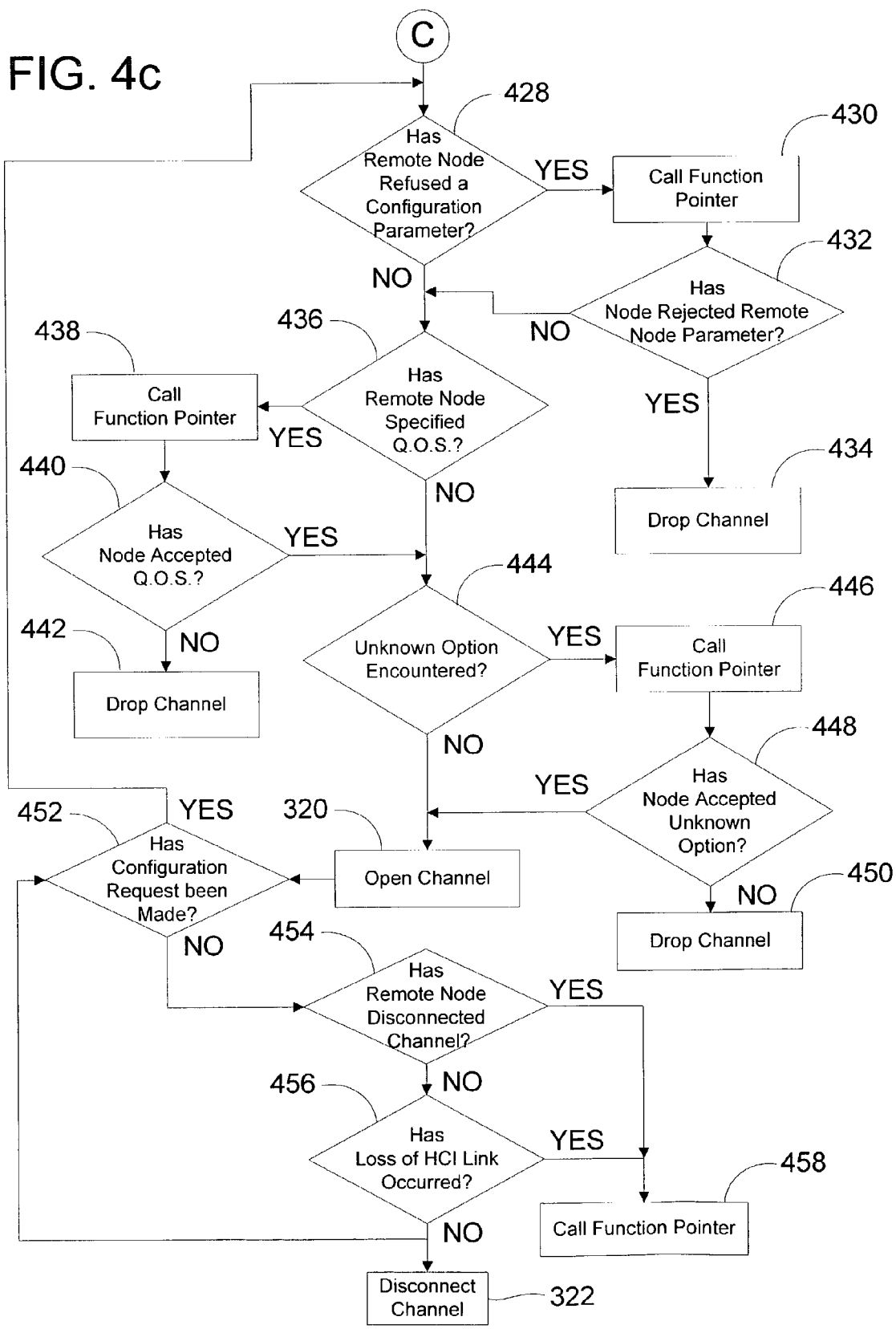
FIG. 4c is a remaining portion of a flow chart illustrating the process for enabling a driver to participate in the creation and management of a L2CAP channel at a selected level of participation.

Turning now to FIGS. 4a–c, the L2CAP layer determines the level of involvement the node has selected (step 400). If the node has not selected total involvement (step 402) or minimal involvement (step 404), the no involvement level has been selected.

The following actions occur if the node has selected the no involvement level. If the remote node has refused a configuration parameter (step 406), the L2CAP channel is dropped (step 408). If the remote node has specified Q.O.S. (step 410), the L2CAP channel is dropped (step 412). If the remote node sends a configuration request after the L2CAP channel has been opened (step 414) (e.g., a reconfiguration request), the channel is dropped (step 416). If the remote node has accepted all parameters, the L2CAP channel is opened.

If the node has selected minimal involvement (step 404), the node supplies the L2CAP layer 202 with a function pointer (step 418). The function pointer is used to notify the node that the connection has been disconnected by either a remote disconnect or loss of the HCI link. The L2CAP channel is dropped for the same reasons as in the no involvement level, which is indicated by the duplication of steps 406–416 in the minimal involvement path. If the L2CAP channel has been disconnected by the remote node (step 420) or has been disconnected as a result of the loss of the HCI link (step 422), the function pointer is called (step 424).

If the node has selected total involvement (step 402), the node supplies the L2CAP layer 202 with a function pointer (step 426). The function pointer is used as a callback mechanism to notify the node about asynchronous events related to a connection or an attempt to establish a connection. Indications are supplied with the function pointer to specify the event. The indications include an add reference indication, a release reference indication, a remote connect indication, a remote disconnect indication, a remote configuration request indication, a remote configuration response indication, a free extra option indication, and a receive packet indication.

The add reference indication is sent to notify the node that a L2CAP connection has been established so the node may add a reference to the connection object representing the connection. The release reference indication is sent to notify the node that the L2CAP layer 202 has freed all of its references to a connection so that the node may free its connection object if no other references from other nodes remain on the object. The remote connect indication is sent when the remote node is attempting to establish a L2CAP connection. The remote disconnect indication is sent when the remote node has requested a disconnect. The remote configuration request indication is sent if the L2CAP layer 202 has encountered an unknown option so the node will instruct the L2CAP layer how to respond to the unknown option. The remote configuration response indication is sent if the L2CAP layer 202 has received a response that it does not know what a parameter in the response is so that the node will instruct how the L2CAP layer 202 responds. The free extra option indication is sent to request the node to free resources for an extra option if the node has used an extra option (e.g., a custom parameter) that is no longer needed and the L2CAP layer 202 does not know how to free resources for the extra option. The receive packet indication is sent if data is received on a L2CAP channel for which there is no read pending.

The node specifies the same parameters as in the no involvement level and any additional parameters the node wants. If the remote node has refused a parameter (step 428), the function pointer is called to confirm the remote node's change to the parameter or reject the change to the parameter (step 430). If the node has rejected the change to the parameter, the L2CAP channel is dropped (step 434). If the remote node has specified Q.O.S. (step 436), the function pointer is called (step 438) to confirm or reject the Q.O.S. If the node has rejected the Q.O.S. (step 440), the L2CAP channel is dropped (step 442). If an unknown option (e.g., a custom parameter) is encountered (step 444), the function pointer is called (step 446) to obtain instructions from the node on how to respond to the unknown option. If the node has rejected the unknown option (step 448), the L2CAP channel is dropped (step 450).

If the remote node sends a reconfiguration request (step 452) the reconfiguration request is accepted and the process of FIGS. 3 and 4 is repeated. If the L2CAP channel has been disconnected by the remote node (step 454) or has been disconnected as a result of the loss of the HCI link (step 456), the function pointer is called (step 458). If at any time the configure parameters are unacceptable to the node, the node returns a failure code and the connection is disconnected.

A technique to simplify the L2CAP channel configuration process for a node has been described. The method enables a node to determine how involved it is in the L2CAP channel connection creation and management process. The complexity of the node is simplified if the node chooses no involvement in the configuration process. This allows developers to more readily incorporate Bluetooth compatibility in devices. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method to implement a logical link control and adaptation protocol (L2CAP) channel for a node comprising the steps of:
   specifying a no involvement level, a minimal involvement level, and a total involvement level, for selectively implementing the L2CAP channel in response to changes in channel parameters;
   determining which one of no involvement, minimal involvement, and total involvement the node has specified for implementing the L2CAP channel; and
   implementing the L2CAP channel in accordance with the one of no involvement minimal involvement, or total involvement.

2. The method of claim 1 wherein the step of implementing the L2CAP channel includes receiving parameters for inbound requests and outbound requests from the node, the parameters including at least one of a minimum transmission unit size, a maximum transmission unit size, a minimum flush timeout, a maximum flush timeout, a quality of service setting, and a link timeout, the method further comprising the steps of:
   sending a configuration request having the parameters to a remote node;
   receiving a remote configuration request from the remote node;
   responding to the remote configuration request in accordance with the one of no involvement, minimal involvement, or total involvement; and
   including the step of opening the L2CAP channel if the remote node has accepted the parameters.

3. The method of claim 2 wherein the step of responding to the remote configuration request includes dropping the L2CAP channel if the node has specified no involvement and the remote node has changed the configuration request in the configuration response.

4. The method of claim 3 further comprising the step of dropping the L2CAP channel if the remote node sends a remote configuration request to reconfigure the L2CAP channel.

5. The method of claim 3 further comprising the step of dropping the L2CAP channel if the remote configuration request includes at least one custom parameter.

6. The method of claim 2 further comprising the steps of:
   receiving a function pointer if the node has specified minimal involvement;
   calling the function pointer if one of the L2CAP connection has been disconnected and a host controller interface link has been lost.

7. The method of claim 6 further wherein the step of responding to the configuration response includes dropping the L2CAP channel if the node has specified minimal involvement and the remote node has not accepted at least one setting in the configuration request.

8. The method of claim 6 further comprising the step of dropping the L2CAP channel if one of the remote node sends a remote configuration request to reconfigure the L2CAP channel and a configuration response includes at least one custom parameter.

9. The method of claim 1 wherein the step of implementing the L2CAP channel includes receiving parameters for inbound requests and outbound requests from the node, the parameters including at least one of a minimum transmission unit size, a maximum transmission unit size, a minimum flush timeout, a maximum flush timeout, a quality of service setting, and a link timeout, the method further comprising the steps of:
   sending a configuration request having the parameters to a remote node;
   receiving a configuration response from the remote node;
   receiving a remote configuration request from the remote node;
   if the node has specified total involvement:
      receiving a function pointer from the node;
      if the remote node has changed at least one of the parameters:
         calling the function pointer to determine if the change to the at least one of the parameters is to be accepted or rejected by the node; and
         opening the L2CAP channel if the node has accepted the change to the at least one of the parameters.

10. The method of claim 9 wherein the step of receiving parameters for inbound requests and outbound requests from the node includes receiving at least one of a preferred transmission unit size and a preferred flush timeout and wherein the step of sending a configuration request having the parameters to a remote node includes sending the at least one of the preferred transmission unit size and the preferred flush timeout.

11. The method of claim 9 wherein the step of calling the function pointer includes providing an indication to inform the node that the at least one of the parameters is to be accepted or rejected by the node.

12. The method of claim 9 further comprising the steps of:
calling the function pointer with a remote configuration request indication if one of an unknown option and a custom option are received from the remote node.

13. The method of claim 9 further comprising the steps of:
calling the function pointer with a remote configuration response indication if a response has been received from the remote node that is not ordinary.

14. The method of claim 9 further comprising the step of dropping the L2CAP channel if the node has rejected the change to the at least one of the parameters.

15. A computer-readable medium having computer executable instructions for implementing a logical link control and adaptation protocol (L2CAP) channel for a node, the computer executable instructions performing the steps of:
specifying involvement levels, for selectively implementing the L2CAP channel in response to changes in channel parameters;
determining which one of no involvement, minimal involvement, and total involvement the node has specified for implementing the L2CAP channel;
receiving parameters for inbound requests and outbound requests from the node, the parameters including at least one of a minimum transmission unit size, a maximum transmission unit size, a minimum flush timeout, a maximum flush timeout, a quality of service setting, and a link timeout sending a configuration request having the parameters to a remote node;
receiving a configuration response from the remote node;
receiving a remote configuration request from the remote node;
responding to the remote configuration request in accordance with the one of no involvement, minimal involvement, or total involvement; and
opening the L2CAP channel if the remote node has accepted the parameters.

16. The computer readable medium of claim 15 wherein the step of receiving parameters for inbound requests and outbound requests from the node includes receiving at least one of a preferred transmission unit size and a preferred flush timeout and wherein the step of sending a configuration request having the parameters to a remote node includes sending the at least one of the preferred transmission unit size and the preferred flush timeout.

17. The computer readable medium of claim 15 having further computer executable instructions for performing the steps comprising:
if the node has specified no involvement:
dropping the L2CAP channel if the remote node has changed the configuration request in the configuration response;
dropping the L2CAP channel if the remote node sends a remote configuration request to reconfigure the L2CAP channel; and
dropping the L2CAP channel if the remote configuration request includes at least one custom parameter.

18. The computer readable medium of claim 15 having further computer executable instructions for performing the steps comprising:
if the node has specified minimal involvement:
receiving a function pointer;
calling the function pointer with a remote disconnect indication if the L2CAP connection has been disconnected.

19. The computer readable medium of claim 18 having further computer executable instructions for performing the steps comprising:
if the node has specified minimal involvement:
dropping the L2CAP channel if the remote node has not accepted at least one setting in the configuration request;
dropping the L2CAP channel if the remote node sends a remote configuration request to reconfigure the L2CAP channel; and
dropping the L2CAP channel if the remote configuration request includes at least one custom parameter.

20. The computer readable medium of claim 15 having further computer executable instructions for performing the steps comprising:
if the node has specified total involvement:
receiving a function pointer;
if the remote node has made a change to at least one of the parameters:
calling the function pointer to determine if the change to the at least one of the parameters is to be accepted or rejected by the node; and
opening the L2CAP channel if the node has accepted the change to the at least one of the parameters.

21. The computer readable medium of claim 15 having further computer executable instructions for performing the steps comprising:
if the node has specified total involvement:
receiving a function pointer;
if the remote node has sent a new remote configuration request after the L2CAP channel has been opened:
stopping at least one of reading data and writing data in the L2CAP channel;
calling the function pointer to notify the node that the new remote configuration request has arrived and to determine if at least one of the parameters is to be rejected by the node;
sending a remote configuration response with a revised parameter for each of the at least one of the parameters to the remote node if the at least one of the parameters is to be rejected by the node;
if the remote node has accepted the revised parameter, performing at least one of reading data and writing data in the L2CAP channel with the revised parameter.

22. The computer readable medium of claim 21 having further computer executable instructions for performing the step comprising disconnecting the L2CAP channel if one of the parameters is not acceptable to the node.

23. The computer readable medium of claim 15 having further computer executable instructions for performing the steps comprising:
if the node has specified total involvement:
receiving a function pointer;
calling the function pointer with a remote disconnect indication if one of the L2CAP connection has been disconnected and a HCI link has been lost.

24. The computer readable medium of claim 15 having further computer executable instructions for performing the steps comprising:
if the node has specified total involvement:
receiving a function pointer;
if a custom parameter has been received:
calling the function pointer with a remote configuration request indication;
receiving a response from the remote node indicating if the custom parameter is accepted, is to be negotiated, or is rejected;
dropping the L2CAP channel if the custom parameter is rejected; and
negotiating the custom parameter if the custom parameter is to be negotiated.

25. A method of communicating between a client driver and an L2CAP object comprising the step of calling a function pointer having at least one indication to notify the external driver of an event, the at least one indication includes:
a remote configuration request indication to allow the client driver to negotiate an unknown option that has been relieved in a configuration request; and
a remote configuration response indication to allow the client driver to determine what an unknown response parameter means.

26. The method of claim 25, where the at least one indication further includes:
a remote connect indication to notify the client driver that a remote node is attempting to establish an L2CAP connection; and
a remote disconnection indication to notify the client driver that the remote node has requested a disconnect of the L2CAP connection.

27. The method of claim 26 wherein the at least one indication further includes a free extra options indication to inform the client driver to free resources for extra options.

28. A computer-readable medium having computer executable instructions for implementing a logical link control and adaptation protocol (L2CAP) channel for a node, the computer executable instructions performing the steps of:
specifying a range of acceptable connection parameters;
receiving a range of connection parameters from the node; and
implementing the L2CAP channel upon determination that the received connection parameters are in accordance with the range of acceptable connection parameters.

29. The computer-readable medium of claim 28 having further computer executable instructions for performing the steps comprising:
sending a configuration request having a set of parameters from the range of acceptable connection parameters to a remote node;
receiving a configuration response from the remote node;
responding to a remote configuration request in accordance with the range of acceptable parameters; and
opening the L2CAP channel if the remote node has accepted the set of parameters.

30. The computer-readable medium of claim 28 having further computer executable instructions for performing the steps comprising:
receiving a function pointer from the node;
calling the function pointer if one of the L2CAP channel has been disconnected and a host controller interface link has been lost.

31. The computer-readable medium of claim 28 wherein the range of acceptable parameters includes parameters for inbound requests and outbound requests from the node, the parameters including at least one of a minimum transmission unit size, a maximum transmission unit size, a minimum flush timeout, a maximum flush timeout, a quality of service setting, and a link timeout, the computer-readable medium having further computer executable instructions for performing the steps comprising:
sending a configuration request having the parameters to a remote node;
receiving a configuration response from the remote node;
receiving a remote configuration request from the remote node;
if the node has specified total involvement:
receiving a function pointer from the node;
if the remote node has changed at least one of the parameters:
calling the function pointer to determine if the change to the at least one of the parameters is to be accepted or rejected by the node; and
opening the L2CAP channel if the node has accepted the change to the at least one of the parameters.

32. The computer-readable medium of claim 31 wherein the parameters for inbound requests and outbound requests includes at least one of a preferred transmission unit size and a preferred flush timeout.

* * * * *